United States Patent [19]

Eagen et al.

[11] Patent Number: 4,687,018
[45] Date of Patent: Aug. 18, 1987

[54] JACKETED VALVE

[75] Inventors: Duane M. Eagen; Robert K. Meek, both of Norman, Okla.

[73] Assignee: Prince Valve, Inc., Norman, Okla.

[21] Appl. No.: 871,905

[22] Filed: Jun. 9, 1986

[51] Int. Cl.⁴ .............................................. F16K 15/03
[52] U.S. Cl. .................................. 137/340; 137/515.7; 137/527.8
[58] Field of Search ............ 137/340, 375, 515, 515.7, 137/527, 527.8

[56] References Cited

U.S. PATENT DOCUMENTS

| | | |
|---|---|---|
| 542,417 | 7/1895 | Lenhart . |
| 2,729,238 | 1/1956 | Hite . |
| 2,886,062 | 5/1959 | Wheatley ..................... 137/515.7 X |
| 2,930,400 | 3/1960 | Wheatley . |
| 3,172,424 | 3/1965 | Stillwagon . |
| 3,395,727 | 8/1968 | Weise et al. . |
| 3,538,946 | 11/1970 | Hilsheimer . |
| 3,565,107 | 2/1971 | Bunch . |
| 3,831,628 | 8/1974 | Kintner et al. . |
| 3,933,173 | 1/1976 | Kajita . |
| 3,959,827 | 6/1976 | Kaster . |
| 4,079,751 | 3/1978 | Partridge et al. . |
| 4,128,111 | 12/1978 | Hansen et al. . |
| 4,176,675 | 12/1979 | Liberman ............................ 137/340 |
| 4,201,241 | 5/1980 | Schertler . |
| 4,230,150 | 10/1980 | Scaramucci . |
| 4,274,436 | 6/1981 | Smith . |
| 4,556,083 | 12/1985 | Schleiter ...................... 137/515.7 X |
| 4,586,534 | 5/1986 | McNeely .......................... 137/515.7 |
| 4,605,041 | 8/1986 | Teumer ........................ 137/515.7 X |

Primary Examiner—Robert G. Nilson
Attorney, Agent, or Firm—Alan T. McCollom

[57] ABSTRACT

A jacketed valve in which an annular jacket or ring is received over a wafer-type check valve. The ring includes eight axial bores therethrough spaced at 45° intervals to accommodate flange studs when the jacketed valve is received between a pair of pipe flanges. In one embodiment, the annular ring is split in half along a plane normal to the ring axis.

25 Claims, 6 Drawing Figures

JACKETED VALVE

BACKGROUND AND SUMMARY OF THE INVENTION

The instant invention relates to wafer-type check valves which are adapted to be received between a pair of pipeline flanges and more particularly, to such valves which are of substantially the same diameter as the flanges between which the valve is received.

The usual wafer-type check valve comprises a substantially annular valve body having a valve means or clapper pivotally mounted on the body. The body includes an annular seat against which the clapper is urged when pressure on the downstream side of the valve exceeds pressure on the upstream side, thus permitting fluid flow only from the upstream to the downstream side of the valve.

The usual pipeline flange is substantially annular in shape and extends radially outwardly from the outer diameter of the pipe on which it is mounted. The face of the flange is normal to the longitudinal axis of the pipe and includes eight axial bores therethrough which are equally spaced about the flange in 45° intervals. Threaded studs may thus be used to connect the flange on one pipe to a flange on another pipe for forming a pipeline or may be used to sandwich a wafer-type check valve between the flanges.

Normally, the diameter of the check valve for a given size of pipe is smaller than the diameter of the flange for the pipe in question. Thus, when the check valve is received between the flanges and its axis is aligned with the pipeline axis, threaded studs may be inserted through the opposing flange bores without hitting the check valve. In other words, the diameter of the check valve is less than the diameter of a circle passing through the axis of each flange stud bore.

The instant invention comprises an annular ring or jacket having an upstream face and a downstream face and a central bore therethrough. A wafer-type check valve having an upstream and a downstream face is received within the central bore with the check valve and jacket upstream faces being substantially planar and the check valve and jacket downstream faces being substantially planar when the check valve is so received. A plurality of axial stud bores are spaced about the circumference of the jacket for alignment with corresponding flange stud bores when the jacket is received between a pair of opposing flanges.

Numerous advantages over the prior art will be readily apparent to a person having ordinary skill in the art when the following detailed description is read in view of the accompanying drawings wherein.

DETAILED DESCRIPTION OF THE PREFERRED EMBODIMENTS OF THE INVENTION

Figure 1:
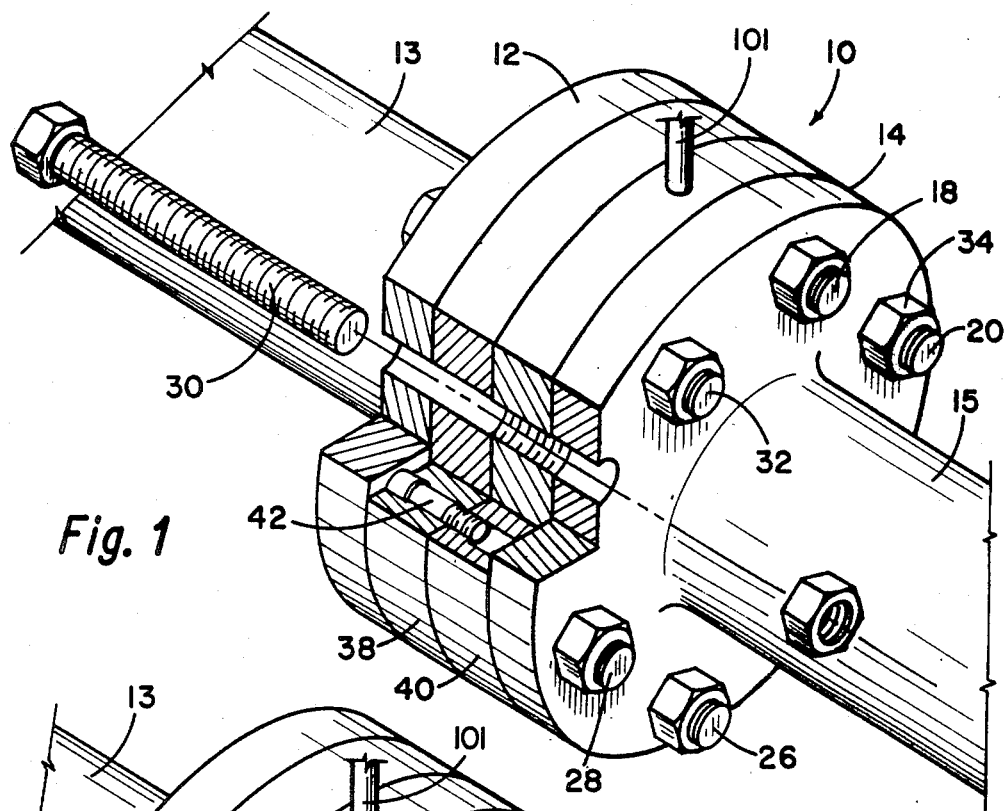
FIG. 1 is a perspective view of a jacketed valve constructed in accordance with the instant invention installed between a pair of pipeline flanges with a portion of the valve and the flanges broken away.

Turning now to the drawings, indicated generally at 10 is a jacketed valve constructed in accordance with the instant invention. Valve 10 is sandwiched between a pair of pipe flanges 12, 14. Each of flanges 12, 14 include a cylindrical portion 13, 15, respectively, each of which is welded to one end of a pipe (not shown) thus forming a pipeline having a valve 10 therein. A plurality of studs or bolts 18, 20, 22, 24, 26, 28, 30, 32 are received through valve 10 and through the pipe flanges. Each of the bolts is secured to flange 14 by a nut, like nut 34 on bolt 20.

Figure 2:
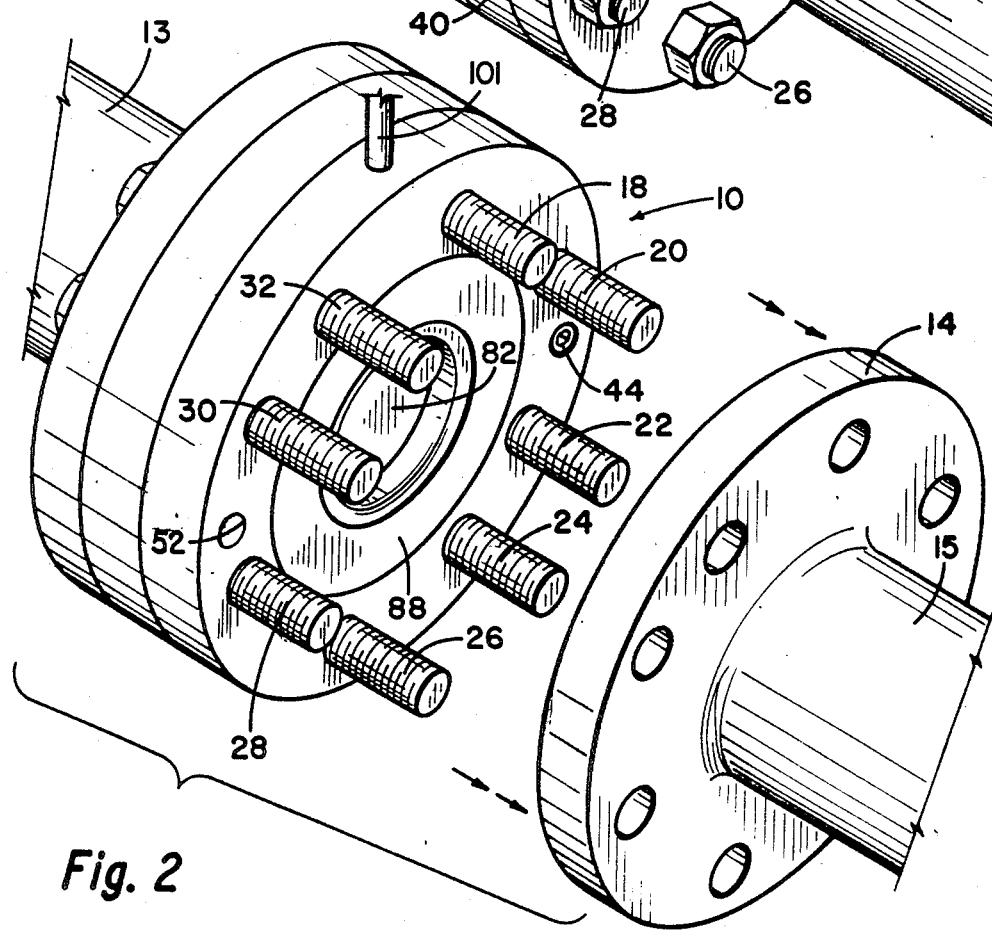
FIG. 2 is a perspective view similar to FIG. 1 with one of the pipeline flanges removed.
Figure 3:
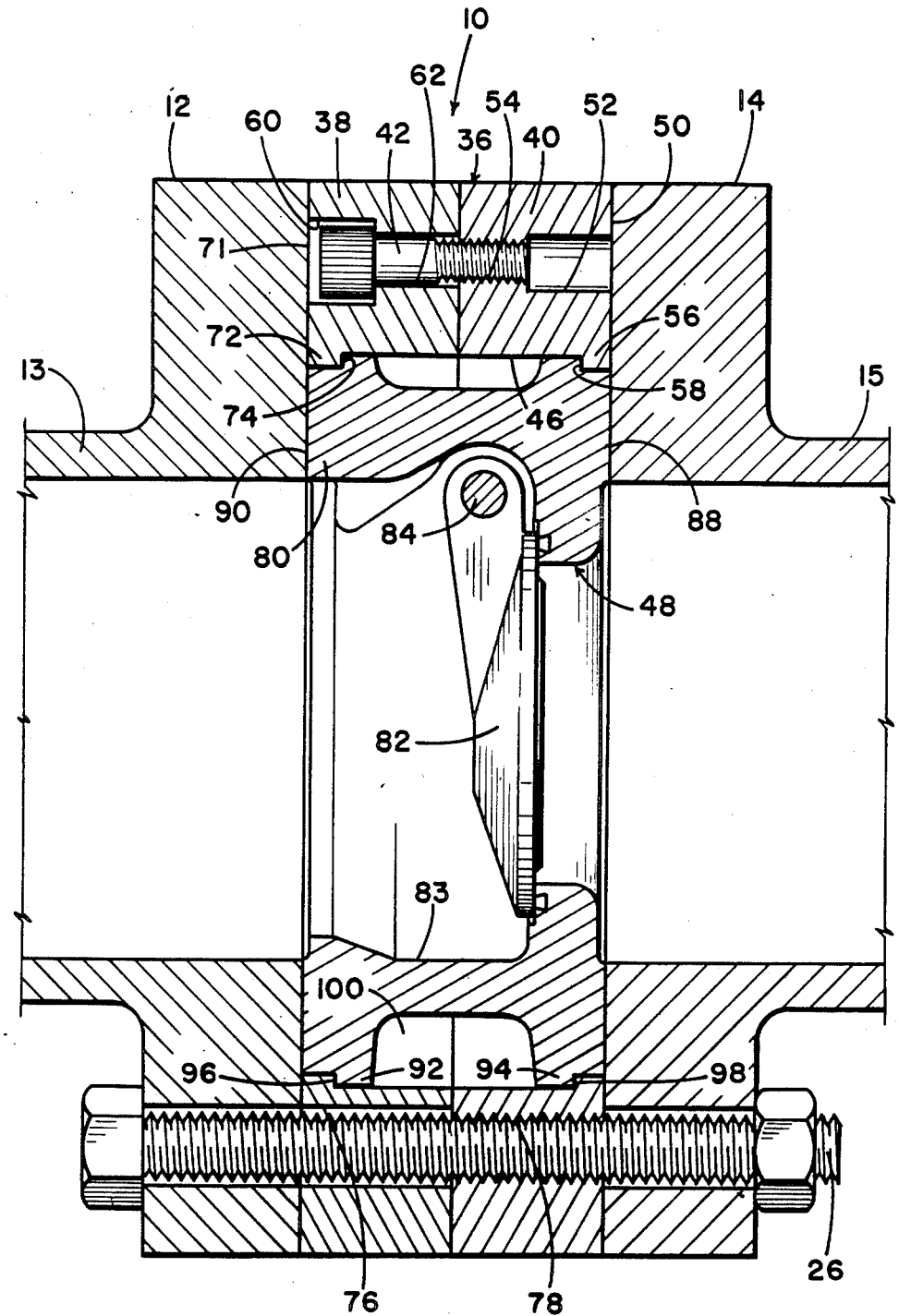
FIG. 3 is a view of the valve of FIG. 1 with the upper portion of FIG. 3 being a sectional view through one of the screws connecting the valve jacket halves and the lower portion of FIG. 3 being a sectional view through one of the pipelines studs.

Considering now FIG. 3, valve 10 includes an annular ring or jacket 36, such also being referred to herein as a second body portion. Jacket 36 is made up of a pair of jacket halves 38, 40. The jacket halves are secured to one another via a pair of screws, one of which is screw 42 in FIGS. 1 and 3, the other of which is screw 44, the head of which is viewable in FIG. 2. It should be noted that the view of FIG. 3 is not a true cross-section since screw 42 is shifted upwardly 90°. This shift in the drawing of FIG. 3 is made to show a section through one of the screws, like screw 42, holding joint halves 38, 40 together while at the same time showing a section through one of the bolts like bolt 26, and essentially combines two views into one.

Jacket 36 includes a central bore 46 having a check valve 48 received therein. Jacket half 40 includes an upstream face 50 having a bore 52 formed therein. Bore 52 is coaxially aligned and in communication with a threaded bore 54 which in turn communicates with the face of jacket half 40 opposite face 50, also viewable in FIG. 4.

Jacket half 40 further includes an annular lip 56 having a face 58 directed downstream.

Figure 4:
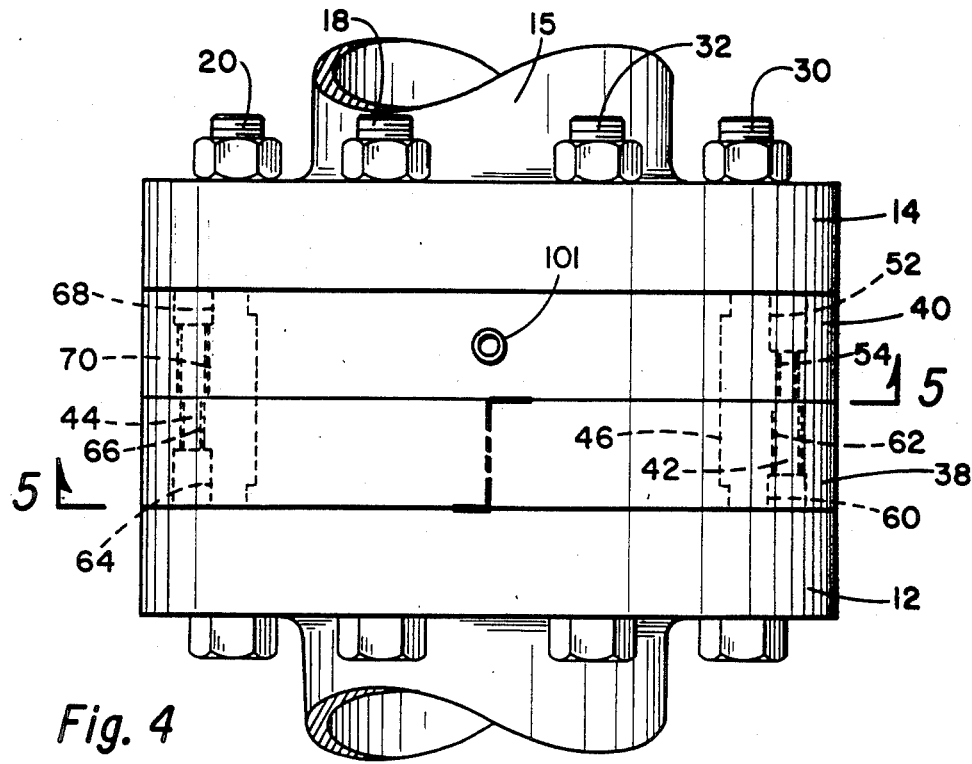
FIG. 4 is a top plane view of the valve of FIG. 1.

Jacket half 38 includes a pair of coaxial bores 60, 62 formed axially therethrough. As can be seen in FIGS. 3 and 4, screw 42 is threadably engaged with the threads in bore 54 and serves to hold the jacket halves together.

Also viewable in FIG. 4 is bore 64 and threaded bore 66 formed through jacket half 38 and bores 68, 70 formed through jacket half 40. Bores 64–70 are located 180° about the circumference of jacket 36 from bores 52, 54, 60, 62 and accommodate screw 44 in the same manner as screw 42 is accommodated in its associated bores.

Returning again to FIG. 3, jacket half 38 includes a downstream face 71 and an annular lip 72 having an upstream directed face 74.

Eight axial bores are formed through jacket half 38, one of which is bore 76 in FIG. 3, to accomodate the bolts, like bolt 26, when jacket half 38 is aligned with flange 12 as shown in FIGS. 1 and 2. In the view of FIG. 2, each of bolts 18–32 is shown extending from its associated threaded bore in jacket half 40 like bolt 26 extends from bore 78.

It should be noted that jacket halves 38, 40 are substantially identical to one another in construction except that the eight axial bores in jacket half 40, like bore 78, are threaded while the eight axial bores, like bore 76, in jacket half 38 are not.

Figure 5:
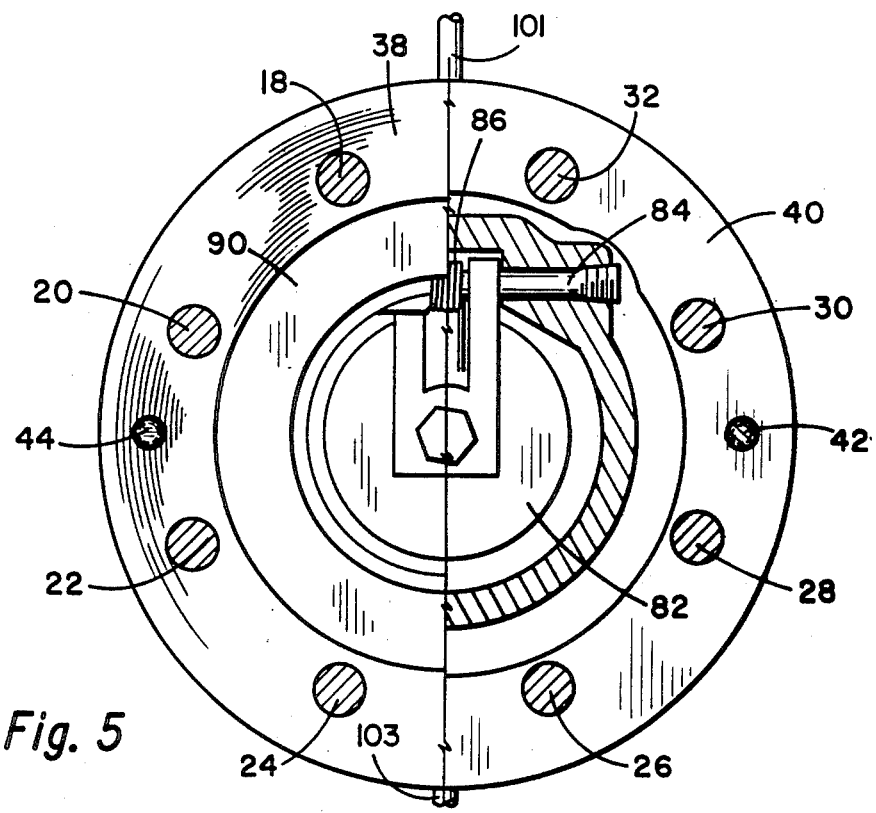
FIG. 5 is a view taken along line 5—5 in FIG. 4.

Check valve 48 includes therein a substantially annular valve body 80, such being also referred to herein as a second body portion. Also included in the check valve is a valve means or clapper 82. Clapper 82 is pivotally mounted on hinge pin 84 which is supported by body 80, for upward pivoting in a downstream direction. A spring 86, in FIG. 5, biases clapper 82 to its closes position as shown in the drawings. Valve body 80 includes an upstream face 88 and a downstream face 90. The valve body further includes a pair of annular lips 92, 94, in FIG. 3, having downstream and upstream directed, respectively, faces 96 98. An annular cavity 100 is formed between the radially outer surface of valve body 80 and central bore 46 in jacket 36. A pair of radial bores in the jacket (not visible) permit fluid communication between annular cavity 100 and the exterior of the valve jacket. A fluid input fitting 101 is in fluid communication with one of the radial jacket bores and is connected to a source of heated fluid, e.g., steam (not shown). A fluid output fitting 103 is positioned 180° about the circumference of jacket half 40 from fitting 101 and is in fluid communication with the other radial jacket bore. Thus, fluid entering fitting 101 circulates through annular cavity 100 and exits the cavity via fitting 103.

In order to assemble valve 10, jacket halves 38, 40 are fitted over valve body 80 until lip face 58 on jacket half 40 abuts lip face 98 on the valve body and lip face 74 on jacket half 38 abuts lip face 96 on the valve body. Thereafter, screw 42 is inserted into bore 60 and threadedly engaged in bore 54 while screw 44 is inserted into bore 68 and threadedly engaged with bore 66. Both screws are tightened thereby securing jacket 36 about the circumference of the valve body. Thereafter, valve 10 is inserted between facing flanges 12, 14 and each of bolts 18–32 are inserted into the bores in flange 12 as shown in FIG. 1. Each of the bolts is threadedly engaged with its associated bore in jacket half 40, like bolt 26 is engaged with bore 78 in FIG. 3. Each bolt is tightened until the head of the bolt is abutted firmly against flange 12. Thereafter nuts are threaded onto each bolt, like nut 34 is threaded onto bolt 20, until the nuts abut against flange 14.

When the valve is so configured, the central portion of each of bolts 18–32 is received within the bores in the valve jacket thereby protecting the bolts from corrosion which may exist in environment around the valve. Depending upon the type of fluid in the pipeline, it may be necessary for clapper 82 and valve body 80 to be made of a special material. Sometimes the valve body and clapper must be formed from an expensive material due to the type of fluid to which the valve will be exposed. When such is the case, the valve body and clapper may be of one material while the valve jacket may be of another less expensive material thereby reducing the overall expense of jacketed valve 10. In some types of service, the valve body and clapper are plastic and the flanges and associated pipeline are metal with a plastic lining. In such service, if the jacket is formed from metal, the joint formed between the pipeline flanges will be able to sustain higher pressures than if no jacket were used. In some types of pipeline service, it may be necessary for the pipeline to contain heated fluids. When such is the case, steam may be circulated through cavity 100 as previously described in order to maintain the valve at a desired temperature.

If a problem should develop upstream, e.g., a pump malfunction, each of the nuts which secure flange 14, like nut 34, may be removed and through use of a special joint (not shown) flange 15 may be drawn axially upstream, as shown in FIG. 2, thereby permitting repair of the pump while the check valve prevents release of pressure downstream of jacketed value 10.

It is to be appreciated that jacket halves 38, 40 may be made identical to one another by providing jacket half 40 with unthreaded bores in the place of threaded bores, like threaded bore 78, which have the same diameter as bore 76 in jacket half 38. If the jacket halves are so formed, the previously-described removal of flange 14 as shown in FIG. 2 may not be done; however, the other advantages of the jacketed valve are still obtained. In addition, an additional advantage from a manufacturing point of view valve is that jackets halves 38, 40 are identical thus reducing the number of machining steps necessary to produce the jacketed valve.

Figure 6:
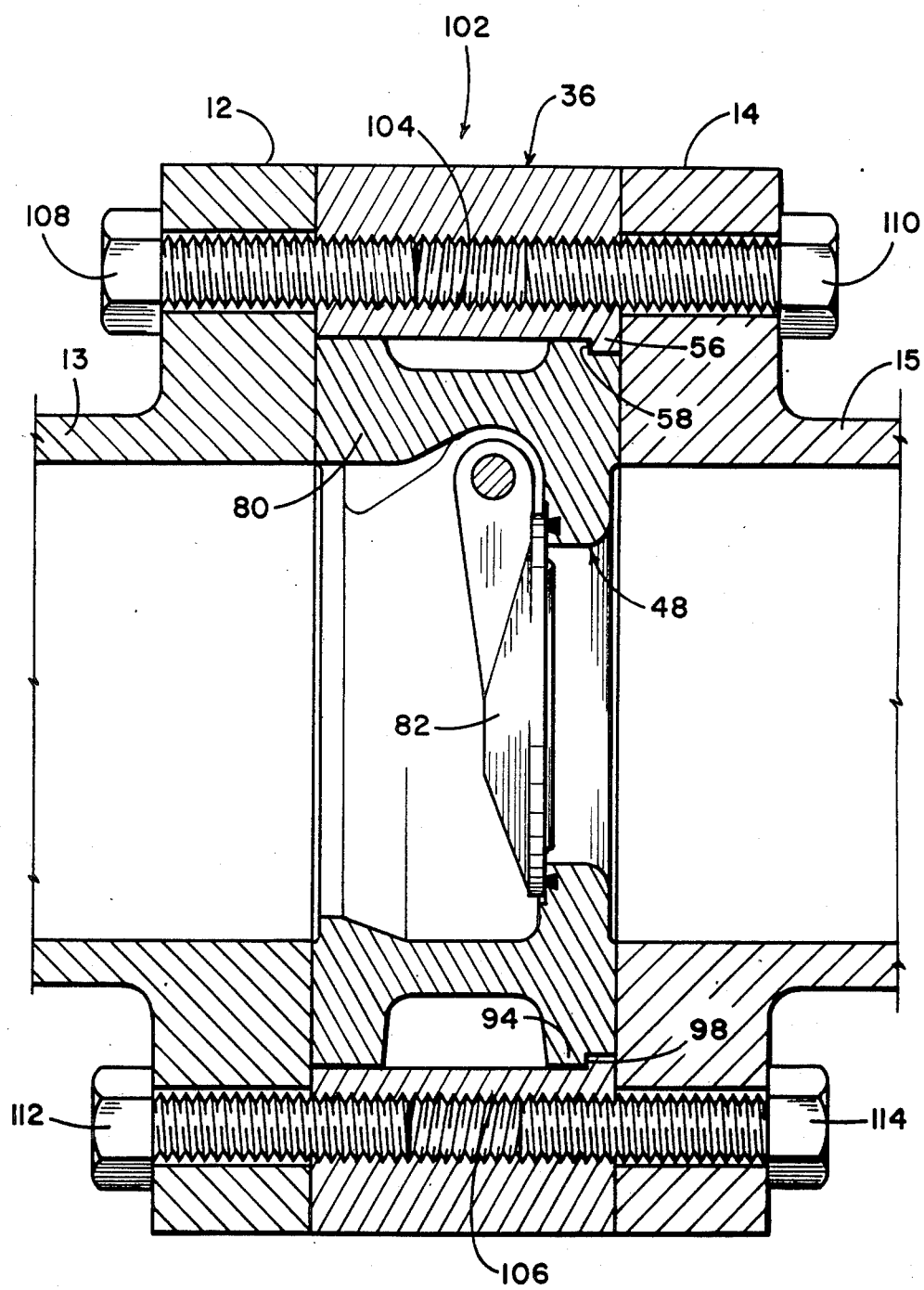
FIG. 6 is a sectional view of a second embodiment of a jacketed valve constructed in accordance with the instant invention with the flange studs shifter so that one appears directly above the check valve and one appears directly below the check valve.

Turning now to FIG. 6, indicated generally at 102 is a second embodiment of a jacketed valve constructed in accordance with the instant invention. Components which have been previously identified retain the same number in FIG. 6.

Valve 102 includes a one-piece jacket 36 instead of jacket halves 38, 40 joined by screws 42, 44 as in the previously-described embodiment. Jacket 36 is substantially annular and includes lip 56 having face 58 thereon. However, unlike the previously-described embodiment there is no lip adjacent the downstream face of the valve jacket.

Jacket 36 includes eight threaded axial bores, like bores 104, 106, such being spaced at 45° angles thereabout. These bores are in alignment with the stud bores in each of flanges 12, 14 and when jacket 36 is received between flanges 12, 14 a total of 16 bolts (eight for flange 12 and eight for flange 14), including bolts 108, 110, 112, 114 may be used to secure the flanges to the valve jacket.

In operation, should it become necessary to repair an upstream pump, all of the bolts in flange 14, including bolts 110, 114 may be removed and the flange shifted laterally in order to repair the pump. Lip 56 acting against lip 94 retains check valve 48 in position thus maintaining any downstream pressure during repair operations. With the embodiment of FIG. 6, the special joint previously mentioned which enables flange 14 to be drawn axially away from jacketed valve 10 as shown in FIG. 2 is not required. This is because with the bolts in flange 14 removed, the flange may be moved laterally without interference from studs extending from the bores in valve jacket 36.

It is to be appreciated that additions and modifications may be made to the embodiments described herein without departing from the spirit of the invention which is defined in the following claims.

We claim:

1. A valve of the type having substantially planar upstream and downstream faces to enable securing the valve between a pair of pipe flanges having a plurality of stud bores therethrough, said valve comprising:

a first substantially-cylindrical body portion having a pair of opposed substantially planar ends and a central bore therethrough;

valve means disposed in said central bore for restricting fluid flow therethrough;

a second substantially-annular body portion made up of two substantially identical halves having a pair of opposed substantially planar ends and a central bore therethrough, said first body portion being receivable in said second body portion central bore, said body portions presenting substantially planar upstream and downstream faces when said first body portion is so received; and a plurality of axial stud bores disposed about the circumference of said second substantially-annular body portion, said stud bores being sized and spaced so that each second-body-portion stud bore may be aligned with a corresponding flange stud bore when said second body portion is received between said pipe flanges.

2. The valve of claim 1 wherein the radially outer diameter of said first body portion is substantially equal to the diameter of said pipe flanges.

3. The valve of claim 1 wherein an annular cavity is defined between the radially outer surface of said first body portion and the radially inner surface of said second body portion when said first body portion is received in said second body portion central bore.

4. The valve of claim 1 wherein said halves oppose one another along a plane substantially normal to the longitudinal axis of said second body portion.

5. The valve of claim 4 wherein said valve further includes means for holding said halves together.

6. The valve of claim 4 wherein said second body portion stud bores extend through each of said second body portion halves and wherein the second body portion bores on the upstream half are threaded for enabling threaded engagement with threaded studs received through said flange stud bores when said second body portion bores are aligned therewith.

7. A jacket for a wafer type check valve of the type which is secured with studs between a pair of pipeline flanges, said jacket comprising:

an annular ring having a central bore therethrough of a diameter substantially equal to the diameter of such a valve, said ring having an upstream face and a downstream face which are substantially coplanar with the upstream and downstream faces, respectively, of such a valve when it is received in said central bore;

a plurality of axial stud bores disposed about the circumference of said ring, said stud bores being sized and shaped so that each ring stud bore can receive a stud when said ring is received between said pipe flanges;

an annular cavity defined between the radially outer surface of such a check valve and the radially inner surface of said ring when the valve is received therein; and means for injecting fluid into said cavity for maintaining such a valve at a selected temperature;

said ring being constructed and arranged to position such a valve for pipeline operation when the valve is received in said ring central bore and said studs are received in said ring stud bores.

8. Apparatus for use with a valve of the type having an annular valve body which may be secured between a pair of pipe flanges having a plurality of stud bores therethrough, said apparatus comprising a substantially annular ring having a central bore therethrough of a size sufficient to receive said valve body therein; and an annular cavity defined between the radially outer surface of said valve body and the radially inner surface of said ring when said valve body is received therein;

a plurality of axial stud bores disposed about the circumference of said ring, said stud bores being sized and spaced so that each ring stud bore may be aligned with a corresponding flange stud bore when said ring is received between said pipe flanges; and means for injecting fluid into said cavity for maintaining such a valve at a selected temperature.

9. Apparatus for use with a valve of the type having an annular valve body which may be secured between a pair of pipe flanges having a plurality of stud bores therethrough, said apparatus comprising:

a substantially annular ring having a central bore therethrough of a size sufficient to receive said valve body therein;

a plurality of axial stud bores disposed about the circumference of said ring and extending into said ring from each side thereof, said stud bores being sized and spaced so that each ring stud bore may be aligned with a corresponding flange stud bore when said ring is received between said pipe flanges; and a set of threads formed in each ring stud bore for enabling threaded engagement with a bolt received through a flange stud bore when a ring stud bore is aligned therewith.

10. The apparatus of claim 9 wherein said valve body includes an annular lip formed on the radially outer surface of said valve body adjacent the upstream end thereof and wherein said annular ring includes an annular lip formed on the radially inner surface of said ring adjacent the upstream end thereof, said lips abutting against one another when said valve body is received within said ring central bore.

11. The apparatus of claim 10 wherein said valve body lip faces upstream.

12. Apparatus for use with a valve of the type having an annular valve body which may be secured between a pair of pipe flanges having a plurality of stud bores therethrough, said apparatus comprising a substantially annular ring having a central bore therethrough of a size sufficient to receive said valve body therein, said annular ring being made up of substantially identical halves; and a plurality of axial stud bores disposed about the circumference of said ring, said stud bores being sized and spaced so that each ring stud bore may be aligned with a corresponding flange stud bore when said ring is received between said pipe flanges.

13. The apparatus of claim 12 wherein the radially outer diameter of said ring is substantially equal to the diameter of said pipe flanges.

14. The apparatus of claim 12 wherein an annular cavity is defined between the radially outer surface of said valve body and the radially inner surface of said ring when said valve body is received therein.

15. The apparatus of claim 12 wherein said halves oppose one another along a plane substantially normal to the longitudinal axis of said ring.

16. The apparatus of claim 15 wherein said ring stud bores extend through each of said ring halves and wherein the ring stud bores on the upstream ring half are threaded for enabling threaded engagement with threaded studs received through said flange stud bores when said ring stud bores are aligned therewith.

17. The apparatus of claim 15 wherein said valve body includes a pair of opposed annular lips formed on the radially outer surface of said valve body adjacent each end thereof and wherein each of said ring halves includes an annular lip formed on the radially inner surface of said ring half adjacent the outer face thereof, said ring half lips abutting against said valve body lips when said valve body is received within said ring central bore.

18. The apparatus of claim 17 wherein the valve body lip adjacent the upstream end of said valve body faces upstream and the valve body lip adjacent the downstream end of said valve body faces downstream.

19. The apparatus of claim 12 wherein said annular ring and said valve body are made from different material.

20. A valve of the type having substantially planar upstream and downstream faces to enable securing the valve between a pair of pipe flanges having a plurality of stud bores therethrough, said valve comprising:
- a first substantially-cylindrical body portion having a pair of opposed substantially planar ends and a central bore therethrough;
- valve means disposed in said central bore for restricting fluid flow therethrough;
- a second substantially-annular body portion having a pair of opposed substantially planar ends and a central bore therethrough, said first body portion being receivable in said second body portion central bore, said body portions presenting substantially planar upstream and downstream faces when said first body portion is so received;
- a plurality of axial stud bores disposed about the circumference of said second substantially-annular body portion, said stud bores being sized and spaced so that each second-body-portion stud bore may be aligned with a corresponding flange stud bore when said second body portion is received between said pipe flanges;
- an annular cavity defined between the radially outer surface of said first body portion and the radially inner surface of said second body portion when said first body portion is received in said second body portion central bore; and
- means for injecting fluid into said cavity for maintaining such a valve at a selected temperature.

21. A jacket for a wafer type check valve of the type which is secured with studs between a pair of pipeline flanges, said jacket comprising:
- an annular ring made up of two substantially identical halves and having a central bore therethrough of a diameter substantially equal to the diameter of such a valve, said ring having an upstream face and a downstream face which are substantially coplanar with the upstream and downstream faces, respectively, of such a valve when it is received in said central bore; and
- a plurality of axial stud bores disposed about the circumference of said ring, said stud bores being sized and spaced so that each ring stud bore can receive a stud when said ring is received between said pipe flanges;
- said ring being constructed and arranged to position such a valve for pipeline operation when the valve is received in said ring central bore and said studs are received in said ring stud bores.

22. The jacket of claim 21 wherein the radially outer diameter of said ring is substantially equal to the diameter of said flanges.

23. The jacket of claim 21 wherein an annular cavity is defined between the radially outer surface of such a check valve and the radially inner surface of said ring when the valve is received therein.

24. The apparatus of claim 21 wherein said halves oppose one another along plane substantially normal to the longitudinal axis of said ring.

25. The apparatus of claim 24 wherein said ring stud bores extend through each of said ring halves and wherein the ring stud bores on the upstream ring half are threaded for enabling threaded engagement with threaded studs received through said flange stud bores when said ring stud bores are aligned therewith.

* * * * *

UNITED STATES PATENT AND TRADEMARK OFFICE
CERTIFICATE OF CORRECTION

PATENT NO. : 4,687,018

DATED : August 18, 1987

INVENTOR(S) : Eagen et al.

It is certified that error appears in the above-identified patent and that said Letters Patent is hereby corrected as shown below:

Column 1, line 35 -- another -- should read "other"

Column 2, line 1 -- shifter -- should read "shifted"

Column 5, line 8 -- second-body-portion -- should read "second body portion"

Column 6, line 40 -- comprising -- should read "comprising:"

Column 7, line 35 -- second-body-portion-- should read "second body portion"

Column 8, line 33 -- along plane -- should read "along a plane"

Signed and Sealed this

Eighth Day of December, 1987

*Attest:*

DONALD J. QUIGG

*Attesting Officer*   *Commissioner of Patents and Trademarks*